United States Patent

Igarashi

(10) Patent No.: US 12,160,274 B2
(45) Date of Patent: Dec. 3, 2024

(54) OPTICAL RECEIVING DEVICE AND OPTICAL RECEIVING METHOD

(71) Applicant: NIPPON TELEGRAPH AND TELEPHONE CORPORATION, Tokyo (JP)

(72) Inventor: Ryo Igarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 180 days.

(21) Appl. No.: 17/924,140

(22) PCT Filed: Jun. 8, 2020

(86) PCT No.: PCT/JP2020/022459
§ 371 (c)(1),
(2) Date: Nov. 9, 2022

(87) PCT Pub. No.: WO2021/250723
PCT Pub. Date: Dec. 16, 2021

(65) Prior Publication Data
US 2023/0198630 A1    Jun. 22, 2023

(51) Int. Cl.
*H04B 10/60*    (2013.01)
*H04B 10/61*    (2013.01)

(52) U.S. Cl.
CPC ..... *H04B 10/6164* (2013.01); *H04B 10/6162* (2013.01); *H04B 10/60* (2013.01);
(Continued)

(58) Field of Classification Search
CPC ........... H04B 10/6164; H04B 10/6162; H04B 10/60; H04B 10/61; H04B 10/613; H04B 10/616; H04B 10/6165; H04B 10/612
(Continued)

(56) References Cited

U.S. PATENT DOCUMENTS 4,879,728 A * 11/1989 Tarallo ............... H04L 27/2273
375/330
5,151,926 A * 9/1992 Chennakeshu ......... H04L 7/042
375/333
(Continued)

OTHER PUBLICATIONS

Ilyama et al, The approaches of coherent technology for TDM-PON, Sep. 2019, ECOC, All Document. (Year: 2019).*
(Continued)

*Primary Examiner* — Dibson J Sanchez

(57) ABSTRACT

An optical reception apparatus includes: an optical coherent reception unit that receives a frequency-modulated optical signal whose optical intensity is approximately constant and generates an I-axis component of a reception signal and a Q-axis component of the reception signal based on the optical signal; a conversion unit that generates a digital signal of the I-axis component of the reception signal and a digital signal of the Q-axis component of the reception signal; a differential detection unit that generates a differential detection signal by controlling a delay amount of the digital signal of the I-axis component and a delay amount of the digital signal of the Q-axis component so that a distance between symbols on an IQ plane is increased and by performing differential detection on the digital signal of the I-axis component whose delay amount is controlled and on the digital signal of the Q-axis component whose delay amount is controlled; and an inter-symbol-distance measuring unit that measures a distance between the symbols based on a phase change amount of the differential detection signal and feeds the distance between the symbols back to the differential detection unit.

6 Claims, 12 Drawing Sheets

(52) U.S. Cl.
CPC ............ *H04B 10/61* (2013.01); *H04B 10/613* (2013.01); *H04B 10/616* (2013.01); *H04B 10/6165* (2013.01)

(58) Field of Classification Search
USPC ................................................ 398/202–214
See application file for complete search history.

(56) References Cited

U.S. PATENT DOCUMENTS

| | | | | |
|---|---|---|---|---|
| 5,253,097 | A * | 10/1993 | Naito | H04B 10/614 |
| | | | | 398/205 |
| 5,917,864 | A * | 6/1999 | Asahara | H04L 27/2332 |
| | | | | 375/371 |
| 7,809,083 | B1 * | 10/2010 | Wu | H04L 27/2332 |
| | | | | 375/333 |
| 8,306,438 | B2 * | 11/2012 | Deczky | H04B 10/614 |
| | | | | 398/208 |
| 8,634,727 | B2 * | 1/2014 | Yasuda | H04B 10/6151 |
| | | | | 398/208 |
| 8,855,498 | B2 * | 10/2014 | Tanaka | H04B 10/5055 |
| | | | | 398/159 |
| 9,686,019 | B2 * | 6/2017 | Fukuchi | H04B 10/616 |
| 9,847,841 | B1 * | 12/2017 | Kaneda | H04B 10/6161 |
| 11,223,421 | B1 * | 1/2022 | Xu | H04B 10/616 |
| 2002/0122509 | A1 * | 9/2002 | Mueller | H03D 1/2245 |
| | | | | 375/341 |
| 2003/0007574 | A1 * | 1/2003 | Li | H04L 27/0014 |
| | | | | 375/316 |
| 2004/0136475 | A1 * | 7/2004 | Kobayashi | H04L 27/2332 |
| | | | | 329/304 |
| 2006/0193409 | A1 * | 8/2006 | Chou | H04L 27/0014 |
| | | | | 375/346 |
| 2006/0251190 | A1 * | 11/2006 | Wang | H04L 27/0014 |
| | | | | 375/330 |
| 2009/0129493 | A1 * | 5/2009 | Zhang | H04L 1/005 |
| | | | | 375/260 |
| 2009/0317075 | A1 * | 12/2009 | Mandai | H04B 10/60 |
| | | | | 398/208 |
| 2010/0209121 | A1 * | 8/2010 | Tanimura | H04J 14/06 |
| | | | | 359/239 |
| 2011/0229127 | A1 * | 9/2011 | Sakamoto | H04B 10/6165 |
| | | | | 398/25 |
| 2013/0251082 | A1 * | 9/2013 | Abe | H04B 10/65 |
| | | | | 375/350 |
| 2015/0372766 | A1 * | 12/2015 | Yoshida | H04B 10/61 |
| | | | | 398/208 |
| 2016/0065326 | A1 * | 3/2016 | Kisaka | H04B 10/532 |
| | | | | 398/65 |
| 2018/0287699 | A1 * | 10/2018 | Oyama | H04B 10/677 |
| 2020/0052795 | A1 * | 2/2020 | Morie | H04B 10/07951 |

OTHER PUBLICATIONS

Tabares et al, Simplified Carrier Recovery for Intradyne Optical PSK Receivers in udWDM-PON, Jul. 2018, JLT, All Document. (Year: 2018).*
K. Kikuchi, "Fundamentals of Coherent Optical Fiber Communications", J. Light. Technol, vol. 34, No. 1, Jan. 2016.
K. Kikuchi, "Digital coherent optical communication systems: fundamentals and future prospects", IEICE Electronics Express, vol. 8, No. 20, 1642-1662, 2011.
T. Kanai et al., "Wide-Range Frequency Offset Compensation for CPFSK used as TDM-Based Digital Coherent PON's Upstream Signals", ECOC2018, 2018.
Y. Nakanishi et al., "Novel Optical Quaternary Minimum Shift Keying Technology with Direct Modulation of Conventional DFB Laser and Digital Coherent Detection", IEEE Photonics Conference 2012, 2012.
M. Fujiwara et al., "Performance Evaluation of CPFSK Transmitters for TDM-Based Digital Coherent PON Upstream", OFC2017, 2017.
K. Asami et al., "Digitally-Assisted Compensation Technique for Timing Skew in ATE Systems", 2011 IEEE 17th International Mixed-Signals, Sensors and Systems Test Workshop, 2011.

* cited by examiner

OPTICAL RECEIVING DEVICE AND OPTICAL RECEIVING METHOD

CROSS-REFERENCE TO RELATED APPLICATIONS

This application is a 371 U.S. National Phase of International Application No. PCT/JP2020/022459, filed on Jun. 8, 2020. The entire disclosure of the above application is incorporated herein by reference.

TECHNICAL FIELD

The present invention relates to an optical receiving device and an optical receiving method.

BACKGROUND ART

Many optical transmission apparatuses using a digital coherent transmission system (see NPDs 1 and 2) need an IQ modulator, and this may increase the cost of optical transmission apparatuses. Therefore, to achieve cost reduction of the optical transmission apparatuses, an optical communication system using an optical signal in a continuous phase frequency shift keying (CPFSK) format has been proposed (see NPDs 3 and 4).

CITATION LIST

Non Patent Documents

[NPD 1] K. Kikuchi, "Fundamentals of Coherent Optical Fiber Communications", J. Light. Technol, Vol. 34, No. 1, JANUARY, 2016.
[NPD 2] K. Kikuchi, "Digital coherent optical communication systems: fundamentals and future prospects", IEICE Electronics Express, Vol. 8, No. 20, 1642-1662, 2011.
[NPD 3] T. Kanai et al., "Wide-Range Frequency Offset Compensation for CPFSK used as TDM-Based Digital Coherent PON's Upstream Signals", ECOC2018.
[NPD 4] Y. Nakanishi et al., "Novel Optical Quaternary Minimum Shift Keying Technology with Direct Modulation of Conventional DFB Laser and Digital Coherent Detection", IEEE Photonics Conference 2012.

SUMMARY OF THE INVENTION

Technical Problem

FIG. 11 illustrates an example of frequency modulation of an optical signal in the CPFSK format in the prior art. A diagram in the first row from the top of FIG. 11 illustrates an electric field waveform of a transmission signal or a reception signal (optical). In the binary CPFSK format, a code sequence "sequence of 0s and 1s" of transmission data is transmitted by using a frequency-modulated optical signal. The electric field of a transmission signal or a reception signal (optical) is expressed by mathematical expression (1).

[Math. 1]

$$E_{sig} = A e^{j(\omega_m t - \theta_0)} \quad (1)$$

Here, "$E_{sig}$" represents an electric field of a transmission signal or a reception signal (optical). "A", represents an amplitude (intensity) of an electric field of a transmission signal or a reception signal (optical). In the CPFSK format, the amplitude (intensity) "A" of the electric field is temporally constant. "$\omega_m$" represents a frequency (angular frequency) of a transmission signal or a reception signal (optical). "t" represents time. "$\theta_0$" represents a phase of a transmission signal or a reception signal. "$\theta_0$" represents a phase (initial phase) that does not change temporally.

A diagram in the second row from the top of FIG. 11 illustrates a temporal change "$\omega_m'$" of a frequency of a transmission signal or a reception signal (optical). "$\omega_0$" represents a center frequency of a transmission signal or a reception signal (optical). "$\omega_0 + \omega_{MAX}$" represents a maximum value (positive value) of the frequency of a transmission signal or a reception signal (optical) in a case where the transmission signal is frequency-modulated by using a non-return-to-zero (NRZ) signal. "$\omega_{MAX}$" represents a difference between the maximum value (positive value) of the frequency and the center frequency "$\omega_0$". "$\omega_0 - \omega_{MIN}$" represents a minimum value (positive value) of the frequency of a transmission signal or a reception signal (optical) in a case where the transmission signal is frequency-modulated by using a non-return-to-zero (NRZ) signal. "$\omega_{MIN}$" represents a difference between the minimum value (positive value) of the frequency and the center frequency "$\omega_0$".

The maximum value of the frequency "$\omega_0 + \omega_{MAX}$", the frequency "$\omega_m$", and the minimum value of the frequency "$\omega_0 - \omega_{MIN}$" have a relationship of mathematical expression (2).

[Math. 2]

$$\omega_0 + \omega_{MAX} \geq \omega_m \geq \omega_0 - \omega_{MIN} \quad (2)$$

A complex amplitude "$E_r$" of a reception signal obtained by converting the reception signal (optical) into electricity by a photodiode is expressed by mathematical expression (3).

[Math. 3]

$$E_r = A' e^{j(\omega_m' t - \theta_0')} \quad (3)$$

Here, "$\omega_{CFO}$" represents a phase rotation due to a frequency offset of a carrier. Regarding the phase rotation "$\omega_{CFO}$", "$\omega_{CFO} = \omega_0 - \omega_{LO}$" is satisfied. "$\omega_{LO}$" represents the frequency of a local oscillation light. Here, mathematical expression (4) is satisfied.

[Math. 4]

$$\omega_{CFO} + \omega_{MAX} \geq \omega_m' \geq \omega_{CFO} - \omega_{MIN} \quad (4)$$

An amount of phase change "$\phi_{dif}$" that occurs in a differential detection signal between time "$t_1$" and time "$t_2$" is expressed by mathematical expression (5).

[Math. 5]

$$\varphi_{dif} = \int_{t_1}^{t_2} \omega_m' dt \quad (5)$$

As expressed above, the phase change amount "$\phi_{dif}$" is equal to an area (integration result) of a graph representing a change in the frequency "$\omega_m'$" from the time "$t_1$" to the time "$t_2$". If time "$t_2 - t_1$" is sufficiently short, the phase change amount is proportional to the frequency. Thus, when the frequency of the transmission signal is modulated by using a non-return-to-zero signal, it is possible to modulate the phase change amount of the transmission signal by using the non-return-to-zero signal.

A diagram in the third row from the top of FIG. 11 illustrates a temporal change in the phase change amount "$\phi_{dif}$" of a transmission signal or a reception signal in a case where the time "$\Delta t=t_2-t_1$" is sufficiently short. A diagram in the fourth row from the top of FIG. 11 illustrates a temporal change in the phase change amount "$\phi_{dif}$" after a carrier is compensated for a frequency offset. When the time "$\Delta t=t_2-t_1$" is sufficiently short, the maximum value of the amplitude of the phase change amount is expressed as "$\phi_{MAX}=\omega_{MAX}\Delta t$".

FIG. 12 illustrates examples of a constellation corresponding to symbols in the case illustrated in the fourth row from the top of FIG. 11. The first diagram from the left in FIG. 12 illustrates an example of a constellation in a case where "$\omega_{MAX}\Delta_t=\pi/2$" is satisfied. The second diagram from the left in FIG. 12 illustrates an example of a constellation in a case where "$\omega_{MAX}\Delta t>\pi/2$" is satisfied. The third diagram from the left in FIG. 12 illustrates an example of a constellation in a case where "$\omega_{MAX}\Delta t<\pi/2$" is satisfied.

The transmitted code sequence is identified by performing determination processing using a threshold. When "$\omega_{MAX}\Delta t=\pi/2$" is satisfied, the distance between symbols on an IQ plane is the longest, and the noise characteristics are thus favorable. Therefore, an optical transmission apparatus determines the frequency "$\omega_{MAX}$" and an optical reception apparatus determines the time "$\Delta t$" such that "$\omega_{MAX}\Delta t=\pi/2$" is satisfied.

However, since the optical transmission apparatus needs to determine the frequency "$\omega_{MAX}$" with high accuracy and the optical reception apparatus needs to determine the time "$\Delta t$" so as to satisfy "$\omega_{MAX}\Delta t=\pi/2$", the cost of the optical transmission apparatus increases. As described above, conventionally, there is a problem in that reception sensitivity cannot be improved unless the optical transmission apparatus controls the frequency of an optical signal with high accuracy.

In view of the above-described circumstances, it is an object of the present invention to provide an optical reception apparatus and an optical reception method capable of improving reception sensitivity without causing an optical transmission apparatus to control the frequency of an optical signal with high accuracy.

Means for Solving the Problem

According to one aspect of the present invention, there is provided an optical reception apparatus including: an optical coherent reception unit that receives a frequency-modulated optical signal whose optical intensity is approximately constant and performs coherent detection on the received optical signal to generate an I-axis component of a reception signal and a Q-axis component of the reception signal based on the optical signal; a conversion unit that generates a digital signal of the I-axis component of the reception signal and a digital signal of the Q-axis component of the reception signal by sampling the I-axis component of the reception signal and the Q-axis component of the reception signal; a differential detection unit that generates a differential detection signal by controlling a delay amount of the digital signal of the I-axis component and a delay amount of the digital signal of the Q-axis component so that a distance between symbols on an IQ plane is increased and by performing differential detection on the digital signal of the I-axis component whose delay amount is controlled and on the digital signal of the Q-axis component whose delay amount is controlled; and an inter-symbol-distance measuring unit that measures a distance between the symbols based on a phase change amount of the differential detection signal and feeds the distance between the symbols back to the differential detection unit.

According to one aspect of the present invention, there is provided an optical reception method performed by an optical reception apparatus, the optical reception method including: an optical coherent reception process of receiving a frequency-modulated optical signal whose optical intensity is approximately constant and performing coherent detection on the received optical signal to generate an I-axis component of a reception signal and a Q-axis component of the reception signal based on the optical signal; a conversion process of generating a digital signal of the I-axis component of the reception signal and a digital signal of the Q-axis component of the reception signal by sampling the I-axis component of the reception signal and the Q-axis component of the reception signal; a differential detection process of generating a differential detection signal by controlling a delay amount of the digital signal of the I-axis component and a delay amount of the digital signal of the Q-axis component so that a distance between symbols on an IQ plane is increased and by performing differential detection on the digital signal of the I-axis component whose delay amount is controlled and on the digital signal of the Q-axis component whose delay amount is controlled; and an inter-symbol-distance measuring process of measuring a distance between the symbols based on a phase change amount of the differential detection signal and feeding the distance between the symbols back to the differential detection process.

Effects of the Invention

According to the present invention, it is possible to improve reception sensitivity without causing an optical transmission apparatus to control the frequency of an optical signal with high accuracy.

DESCRIPTION OF EMBODIMENTS

Embodiments of the present invention will be described in detail with reference to the drawings.

First Embodiment

Figure 1:
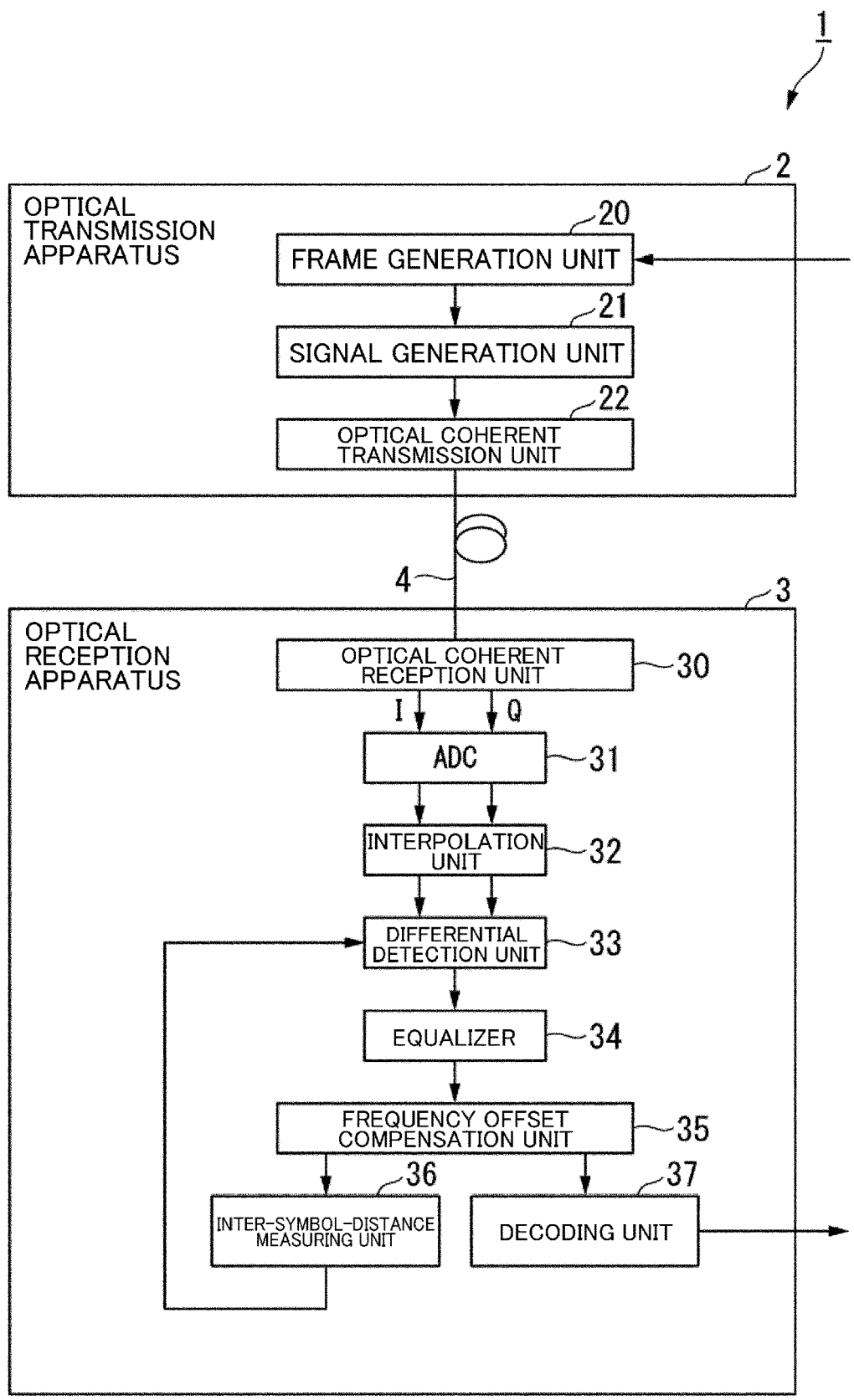
FIG. 1 illustrates an example of a configuration of an optical communication system according to a first embodiment.

FIG. 1 illustrates an example of a configuration of an optical communication system 1 according to a first embodiment. The optical communication system 1 performs communication by using an optical signal whose intensity modulated component is small (for example, an optical signal in the CPFSK format).

The optical communication system 1 performs differential detection processing on a reception signal obtained by performing coherent detection on an optical signal on which a continuous phase frequency shift keying (CPFSK modulation) has been performed. The optical communication system 1 performs processing for compensating a frequency offset on a differential detection signal obtained as a result of the differential detection processing. The optical communication system 1 measures a distance between symbols on an IQ plane based on the differential detection signal. The optical communication system 1 adjusts a delay amount of a reception signal in the differential detection processing such that the distance between symbols is increased.

The optical communication system 1 includes an optical transmission apparatus 2, an optical reception apparatus 3, and a transmission line 4. The optical transmission apparatus 2 includes a frame generation unit 20, a signal generation unit 21, and an optical coherent transmission unit 22.

The optical reception apparatus 3 (optical receiving device) includes an optical coherent reception unit 30, an analog-to-digital converter (ADC) 31, an interpolation unit 32, a differential detection unit 33, an equalizer 34, a frequency offset compensation unit 35, an inter-symbol-distance measuring unit 36, and a decoding unit 37. The transmission line 4 includes an optical fiber.

The frame generation unit 20 acquires transmission data (digital signal). The frame generation unit 20 generates a frame including transmission data in a payload. The frame generation unit 20 outputs the frame to the signal generation unit 21.

The signal generation unit 21 generates a modulated signal, on which the CPFSK modulation corresponding to the frame is performed, as a transmission signal. The signal generation unit 21 outputs the modulated signal to the optical coherent transmission unit 22.

The optical coherent transmission unit 22 performs direct modulation on a drive voltage of a light source provided in the optical coherent transmission unit 22 by using the modulated signal. When direct modulation is performed on the light source, the intensity and frequency of the light output according to the modulated signal is changed. When the amplitude of the modulated signal is small, the intensity modulated component is small. Consequently, the optical coherent transmission unit 22 has performed frequency modulation. In this way, a frequency-modulated coherent optical signal is generated. The optical coherent transmission unit 22 transmits the generated coherent optical signal to the optical reception apparatus 3 via the transmission line 4.

Hereinafter, "$M=(\omega_{MAX}-\omega_{MIN})/(2\pi B)$" represents a modulation index. "B" represents a band. The band "B" is expressed as a symbol rate of the transmission signal. The symbol rate is a modulation frequency of a modulated signal.

The optical reception apparatus 3 increases the distance between symbols of a constellation on the IQ plane by controlling a delay amount of a reception signal in differential detection processing. Thus, even when a modulation index "M" varies in accordance with at least one of $\omega_{MAX}$ and $\omega_{MIN}$ in the optical transmission apparatus 2, the optical reception apparatus 3 can improve reception sensitivity.

In the first embodiment, the optical reception apparatus 3 shortens a sampling period by increasing the number of samples of the reception signal by interpolation processing. That is, the optical reception apparatus 3 shortens the sampling period by improving a sampling rate by the interpolation processing. This enables to control the delay amount of the reception signal in the differential detection processing with high accuracy.

The optical coherent reception unit 30 receives the coherent optical signal transmitted via the transmission line 4. The optical coherent reception unit 30 generates a reception signal by performing coherent detection on the received coherent optical signal. Here, the optical coherent reception unit 30 generates an I-axis component of the reception signal and a Q-axis component of the reception signal based on the result of the coherent detection. The optical coherent reception unit 30 outputs the I-axis component of the reception signal and the Q-axis component of the reception signal to the ADC 31.

The ADC 31 (conversion unit) performs sampling on the I-axis component of the reception signal. In this way, the ADC 31 generates a digital signal (discrete signal) of the I-axis component of the reception signal. Likewise, the ADC 31 performs sampling on the I-axis component of the reception signal. In this way, the ADC 31 generates a digital signal (discrete signal) of the Q-axis component of the reception signal.

The interpolation unit 32 (interpolator) interpolates data between sampling points in the digital signal of the I-axis component. The interpolation unit 32 also interpolates data between sampling points in the digital signal of the Q-axis component. That is, the interpolation unit 32 interpolates sampling points into the digital signal. In this way, the sampling rate of the reception signal is improved. That is, interpolation unit 32 shortens the sampling period. The interpolation unit 32 outputs the digital signal of the I-axis component of the reception signal whose sampling rate has been improved and the digital signal of the Q-axis component of the reception signal whose sampling rate has been improved to the differential detection unit 33.

The differential detection unit 33 acquires the digital signal of the I-axis component of the reception signal whose sampling rate has been improved and the digital signal of the Q-axis component of the reception signal whose sampling rate has been improved from the interpolation unit 32. The differential detection unit 33 acquires a measurement result of the distance between symbols on the IQ plane from the inter-symbol-distance measuring unit 36.

The differential detection unit 33 performs differential detection processing on the acquired digital signals. In accordance with the measurement result of the distance between symbols, the differential detection unit 33 provides the digital signal of the I-axis component of the reception signal and the digital signal of the Q-axis component of the reception signal with a delay amount "Δt" corresponding to N (N is an integer at least one) samples at a time "$t_2$". The delay amount "Δt" is an integral multiple of the period of sampling performed by the interpolation unit 32. In this processing, the differential detection unit 33 sets the delay amount "Δt" based on the measurement result of the distance between symbols on the IQ plane so that the distance between the symbols on the IQ plane becomes the longest. As a result, even when the modulation index is shifted in the optical transmission apparatus 2, the optical reception apparatus 3 can maximize the distance between the symbols on the IQ plane and improve noise immunity.

The differential detection unit 33 derives a complex amplitude "$E_r$" of the reception signal for each sampling point based on the digital signal of the I-axis component to which the delay amount "Δt" has been provided and the digital signal of the Q-axis component to which the delay amount "Δt" has been provided.

The differential detection unit 33 derives a complex conjugate product "$E_r(t_1) \cdot E_r(t_2)^*$" of a first sampling point of the reception signal and a second sampling point of the reception signal as a differential detection signal. Here, a symbol "*" represents a complex conjugate.

The complex-conjugate product "$E_r(t_1) \cdot E_r(t_2)^*$" derived as a differential detection signal includes information about the phase change amount "$\phi_{dif}$" generated between the sampling points and information about the phase rotation "$\omega_{CFO}$" due to the frequency offset of the carrier. The differential detection unit 33 outputs the differential detection signal (complex conjugate product) to the equalizer 34.

Since the differential detection processing has been performed, a phase offset component, which is temporally constant, is removed from the differential detection signal. That is, the differential detection signal has been compensated for the phase offset.

The equalizer 34 acquires the differential detection signal from the differential detection unit 33. The equalizer 34 performs adaptive equalization processing on the differential detection signal. For example, the equalizer 34 uses a FIR filter or the like to compensate for degradation that occurs in the waveform of the differential detection signal due to band limitation in the optical coherent transmission unit 22 and the optical coherent reception unit 30 and transmission of the coherent optical signal on the transmission line 4. The equalizer 34 outputs the differential detection signal on which the adaptive equalization processing has been performed to the frequency offset compensation unit 35.

The frequency offset compensation unit 35 (frequency offset compensator) acquires the differential detection signal on which the adaptive equalization processing has been performed from the equalizer 34. The frequency offset compensation unit 35 compensates for a frequency offset "$\omega_{cFO}\Delta t$" generated in the differential detection signal. That is, the frequency offset compensation unit 35 derives the phase change amount "$\phi_{dif}$" of the differential detection signal for each sampling point by removing the frequency offset component, which is temporally constant, from the differential detection signal. The frequency offset compensation unit 35 outputs the phase change amount "$\phi_{dif}$" of the differential detection signal to the inter-symbol-distance measuring unit 36 and the decoding unit 37.

The inter-symbol-distance measuring unit 36 acquires the phase change amount "$\phi_{dif}$" of the differential detection signal from the frequency offset compensation unit 35. The inter-symbol-distance measuring unit 36 measures a distance between symbols on the IQ plane based on the phase change amount "$\phi_{dif}$" of the differential detection signal. The inter-symbol-distance measuring unit 36 outputs the measurement result of the distance between the symbols to the differential detection unit 33.

The decoding unit 37 performs determination processing on the constellation of the differential detection signal which has been compensated for the frequency offset. That is, the decoding unit 37 identifies whether the code of the transmission signal in the CPFSK format is "0" or "1". Thus, the code sequence of the transmission data is decoded from the phase change amount of the differential detection signal, which has been compensated for the frequency offset. The decoding unit 37 outputs a digital signal representing the decoding result to a predetermined external device (not illustrated).

Next, the interpolation processing will be described.

Figure 2:
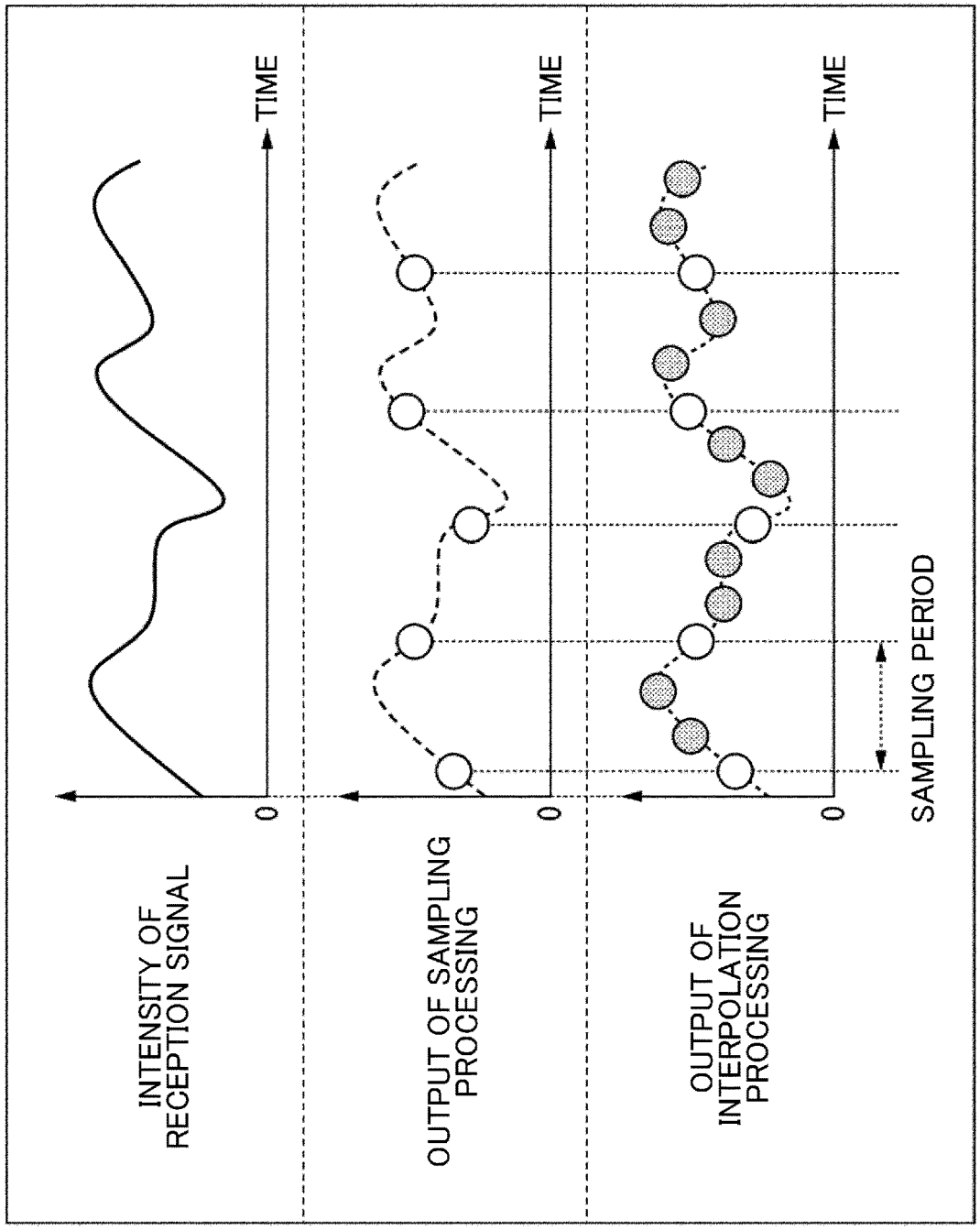
FIG. 2 illustrates an example of intensity of a reception signal, sampling processing, and interpolation processing according to the first embodiment.

FIG. 2 illustrates an example of the intensity of a reception signal, sampling processing, and interpolation processing according to the first embodiment. A diagram in the upper row of FIG. 2 illustrates the intensity of a reception signal based on the received coherent optical signal as the intensity of an analog signal output from the optical coherent reception unit 30 to the ADC 31. The ADC 31 converts the reception signal (analog signal) output from the optical coherent reception unit 30 into a digital signal. The ADC 31 outputs the digital signal to the interpolation unit 32.

The interpolation unit 32 performs interpolation processing to improve the sampling rate of the digital signal output from the ADC 31. The interpolation unit 32 outputs the digital signal whose sampling rate has been improved to the differential detection unit 33.

Figure 3:
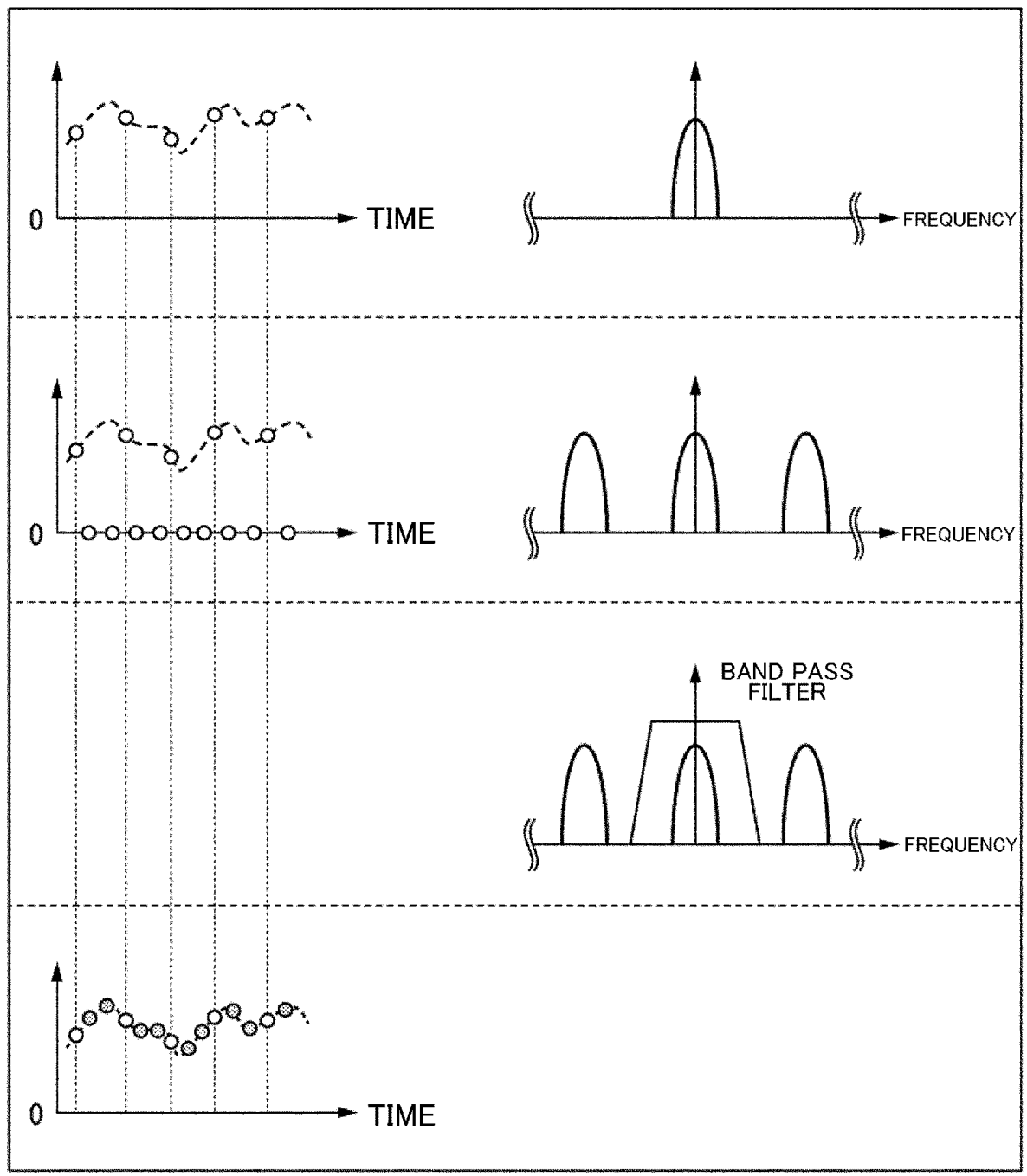
FIG. 3 illustrates an example of details of interpolation processing according to the first embodiment.

FIG. 3 illustrates an example of details of the interpolation processing according to the first embodiment. A diagram in the first row from the top of FIG. 3 illustrates a group of sampling points of an original reception signal and a result of discrete Fourier transform performed on the group of sampling points of the original reception signal.

As illustrated in the left portion of a diagram in the second row from the top in FIG. 3, the interpolation unit 32 interpolates a group of new sampling points each having a value of 0 between the sampling points of the original reception signal at constant intervals. As illustrated in the right portion of the diagram in the second row from the top of FIG. 3, high-frequency components having the same shape as that of the original frequency component appear in a result of discrete Fourier transform performed on a result obtained by interpolating the group of new sampling points.

As illustrated in a diagram in the third row from the top of FIG. 3, the interpolation unit 32 removes the high-frequency component from the discrete Fourier transform result by using a band-pass filter. As illustrated in a diagram in the fourth row from the top of FIG. 3, by performing an inverse Fourier transform on the discrete Fourier transform result from which the high-frequency component has been removed, a waveform of a digital signal whose sampling rate has been improved is generated.

Next, the complex conjugate product "$E_r(t_1) \cdot E_r(t_2)^*$" will be described.

The differential detection unit 33 derives a complex amplitude "$E_r$" of the reception signal for each sampling point based on the digital signal of the I-axis component of the reception signal whose sampling rate has been improved and the digital signal of the Q-axis component of the reception signal whose sampling rate has been improved. The differential detection unit 33 performs the differential detection processing by deriving a complex conjugate product of a predetermined time and a time after a lapse of a certain period of time from the predetermined time.

A product of a complex amplitude "$E_r(t_1)$" of a reception signal at a time "$t_1$" and a complex conjugate "$E_r(t_2)*$" of a complex amplitude of the reception signal at a time "$t_2$" after a lapse of a certain period of time from the time "$t_1$" is expressed by mathematical expression (6).

[Math. 6]

$$E_r(t_1) \cdot E_r(t_2)^* = A'e^{j(\omega'_m t_1 - \theta'_0)} \cdot A'e^{-j(\omega'_m t_2 - \theta'_0)} \quad (6)$$
$$= A'^2 e^{j(\omega'_m \Delta t + \omega_{CFO} \Delta t)}$$
$$= A'^2 e^{j(\varphi_{dif} + \omega_{CFO} \Delta t)}$$

Here, "*" represents a complex conjugate. In addition, mathematical expression (7) is satisfied.

[Math. 7]

$$\begin{cases} \Delta t = t_1 - t_2 \\ \varphi_{dif} = \omega'_m \Delta t \end{cases} \quad (7)$$

Next, the differential detection unit 33 will be described in detail.

Figure 4:
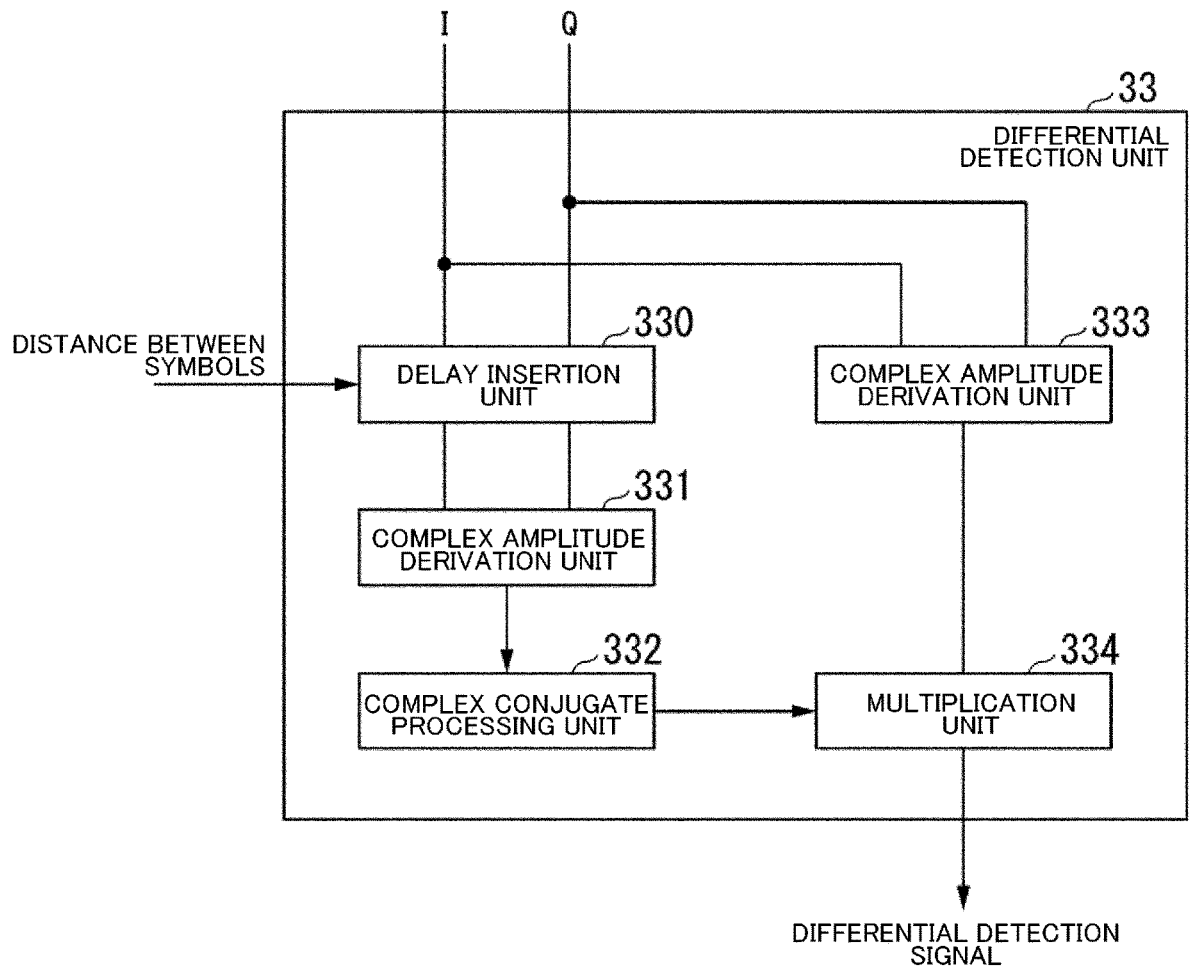
FIG. 4 illustrates an example of a configuration of a differential detection unit according to the first embodiment.

FIG. 4 illustrates an example of a configuration of the differential detection unit 33 according to the first embodiment. The differential detection unit 33 includes a delay insertion unit 330, a complex amplitude derivation unit 331, a complex conjugate processing unit 332, a complex amplitude derivation unit 333, and a multiplication unit 334.

The delay insertion unit 330 acquires the digital signal of the I-axis component of the reception signal and the digital signal of the Q-axis component of the reception signal from the interpolation unit 32. The delay insertion unit 330 acquires a measurement result of the distance between symbols on the IQ plane from the inter-symbol-distance measuring unit 36.

The delay insertion unit 330 derives a delay amount "$\Delta t$" corresponding to N samples so that the distance between symbols becomes the longest. In addition, the delay insertion unit 330 provides the digital signal of the I-axis component of the reception signal and the digital signal of the Q-axis component of the reception signal with the delay amount "$\Delta t$" corresponding to the N (N is an integer at least one) samples and outputs the digital signals at a time "$t_2$". The digital signal of the I-axis component of the reception signal and the digital signal of the Q-axis component of the reception signal to which the delay amount "$\Delta t$" has been inserted are output to the complex amplitude derivation unit 331.

The complex amplitude derivation unit 331 acquires the digital signal of the I-axis component of the reception signal and the digital signal of the Q-axis component of the reception signal that are output from the delay insertion unit 330. The complex amplitude derivation unit 331 derives a complex amplitude "$E_r(t_2)$" of the reception signal based on the digital signal of the I-axis component of the reception signal and the digital signal of the Q-axis component of the reception signal. The complex amplitude derivation unit 331 outputs the complex amplitude of the reception signal to the complex conjugate processing unit 332.

The complex conjugate processing unit 332 acquires the complex amplitude of the reception signal from the complex amplitude derivation unit 331. The complex conjugate processing unit 332 outputs a complex conjugate "$E_r(t_2)*$" of the complex amplitude "$E_r(t_2)$" at the time $t_2$ to the multiplication unit 334.

The complex amplitude derivation unit 333 acquires the digital signal of the I-axis component of the reception signal and the digital signal of the Q-axis component of the reception signal at the time $t_1$ from the interpolation unit 32. The complex amplitude derivation unit 333 outputs a complex amplitude "$E_r(t_1)$" to the multiplication unit 334.

The multiplication unit 334 acquires the complex amplitude "$E_r(t_1)$" of the reception signal at the time $t_1$ from the complex amplitude derivation unit 333. The multiplication unit 334 acquires the complex conjugate "$E_r(t_2)*$" of the complex amplitude of the reception signal at the time $t_2$ from the complex conjugate processing unit 332. The multiplication unit 334 derives a complex conjugate product "$E_r(t_1) \cdot E_r(t_2)*$", which is a produce of the complex amplitude "$E_r(t_1)$" and the complex conjugate "$E_r(t_2)*$". The multiplication unit 334 outputs the complex conjugate product "$E_r(t_1) \cdot E_r(t_2)*$" to the equalizer 34.

Figure 5:
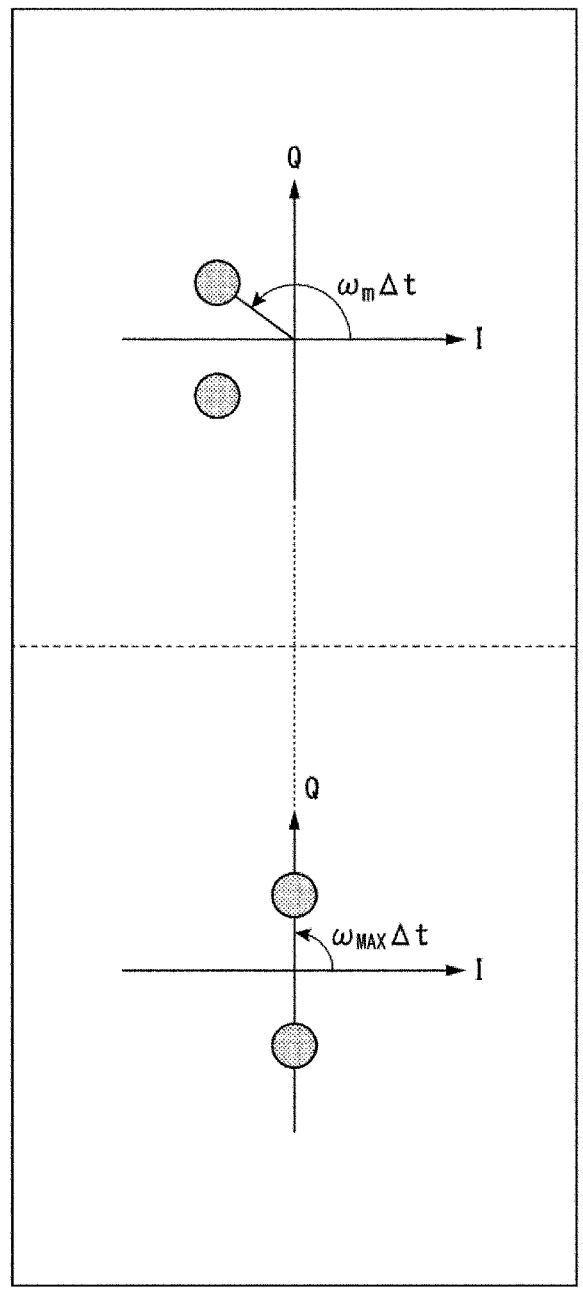
FIG. 5 illustrates an example of a constellation after being compensated for a frequency offset according to the first embodiment.

FIG. 5 illustrates an example of a product of the reception signal at a first time "$t_1$" and the complex conjugate of the reception signal at a second time "$t_2$" according to the first embodiment. Here, for simplicity of description, a case where there is no frequency offset of a carrier will be described.

A diagram in the upper row of FIG. 5 illustrates a complex conjugate product "$E_r(t_1) \cdot E_r(t_2)*$" in the case where there is no frequency offset of the carrier. This complex conjugate product "$E_r(t_1) \cdot E_r(t_2)*$" is expressed by mathematical expression (8).

[Math. 8]

$$E_r(t_1) \cdot E_r(t_2)^* = A'^2 e^{j\omega_m' \Delta t} \quad (8)$$

Regarding the symbols, mathematical expression (9) or (10) is satisfied.

[Math. 9]

$$E_r(t_1) \cdot E_r(t_2)^* = A'^2 e^{j\omega_{MAX} \Delta t} \quad (9)$$

[Math. 10]

$$E_r(t_1) \cdot E_r(t_2)^* = A'^2 e^{j\omega_{MIN} \Delta t} \quad (10)$$

The decoding unit 37 performs threshold determination processing on a constellation obtained in the same manner as a BPSK constellation by converting such a complex conjugate product into symbols. In this way, the decoding unit 37 can identify the code.

As illustrated in a diagram in the lower row of FIG. 5, when "$\omega_{MAX}\Delta t = \eta/2$" and "$-\omega_{MIN}\Delta t = (-\pi/2)$" are defined, the distance between the symbols on the IQ plane is the longest.

Next, frequency offset compensation processing will be described.

Figure 6:
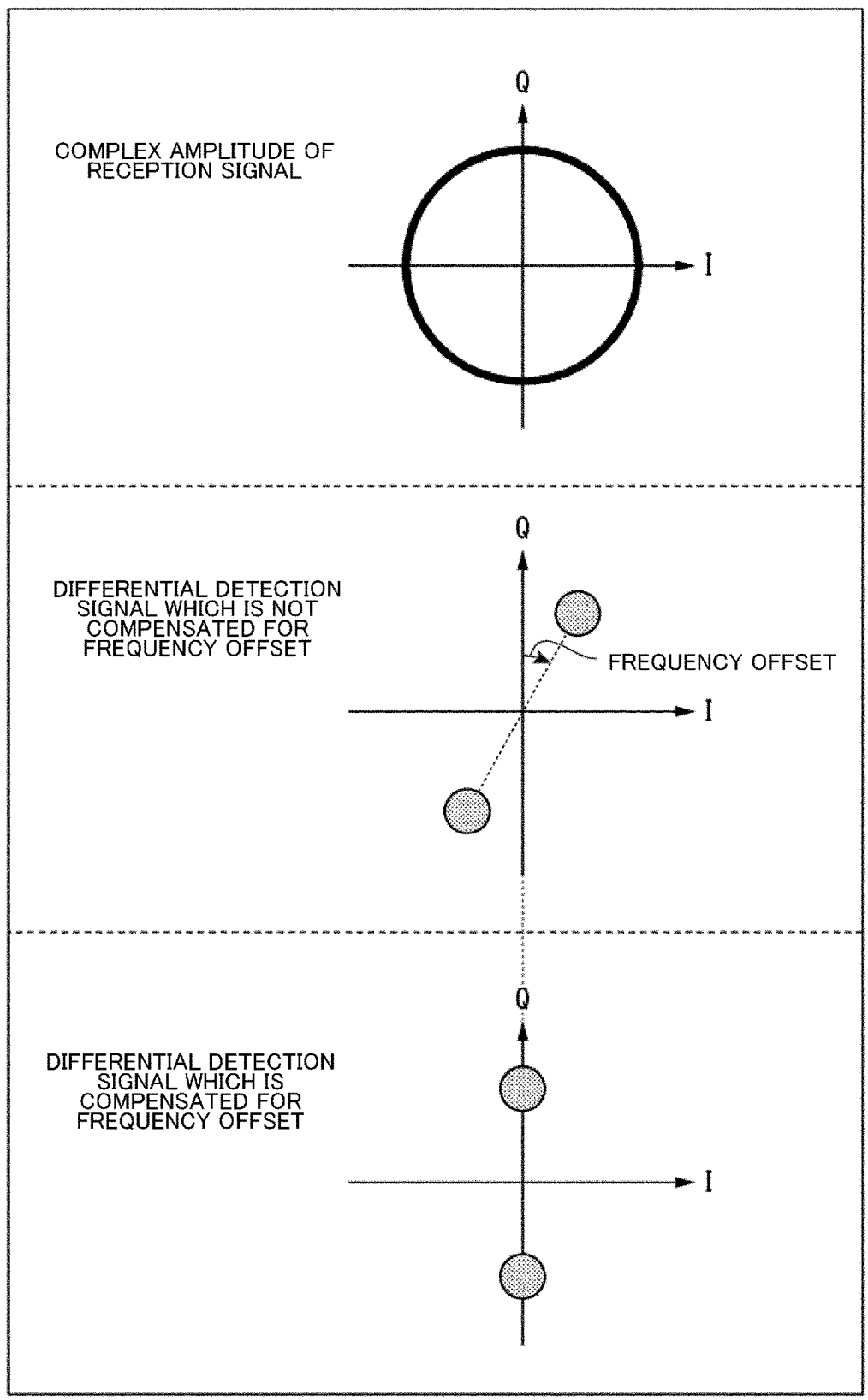
FIG. 6 illustrates an example of complex amplitude of a reception signal and an input and an output of a frequency offset compensation unit according to the first embodiment.

FIG. 6 illustrates an example of the complex amplitude of a reception signal and the input to and output from the frequency offset compensation unit 35 according to the first embodiment.

A diagram in the upper row of FIG. 6 illustrates a complex amplitude "$E_r$" of a reception signal at a symbol position. A diagram in the middle row of FIG. 6 illustrates the input to the frequency offset compensation unit 35 (the output from the equalizer 34) at the symbol position as a differential detection signal which is not compensated for the frequency offset. A diagram in the lower row of FIG. 6 illustrates the output from the frequency offset compensation unit 35 as a differential detection signal which is compensated for the frequency offset.

Next, an example of a method for measuring a distance between symbols will be described.

Figure 7:
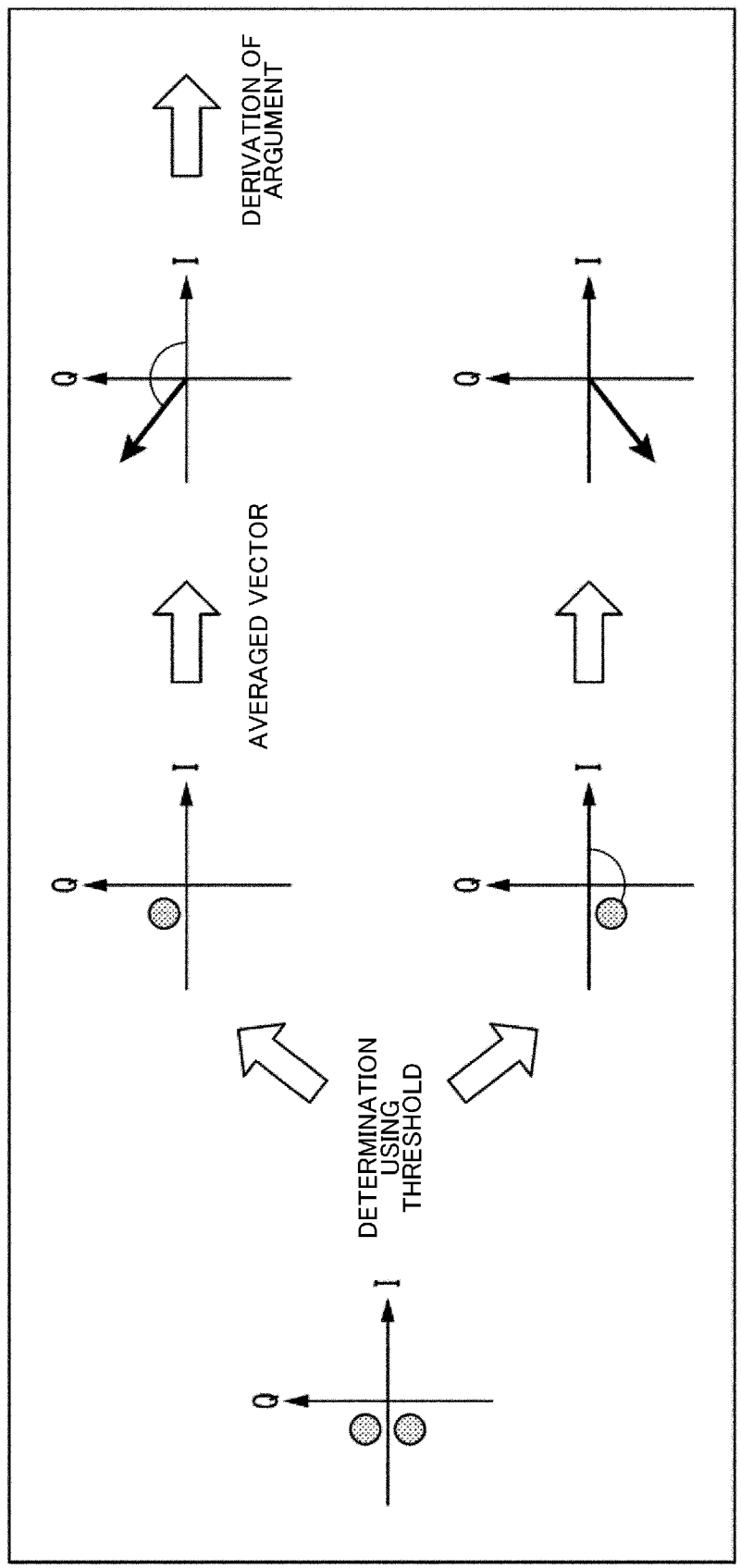
FIG. 7 illustrates an example of a method for measuring a distance between symbols according to the first embodiment.

FIG. 7 illustrates an example of a method for measuring a distance between symbols according to the first embodiment. The inter-symbol-distance measuring unit 36 measures a distance between symbols on the IQ plane based on a phase change amount of the differential detection signal acquired from the frequency offset compensation unit 35. The inter-symbol-distance measuring unit 36 detects coordinates of the symbols on the IQ plane based on a result of a comparison between the symbols and a threshold. The inter-symbol-distance measuring unit 36 averages vectors of the symbols on the IQ plane based on the detection result of the coordinates. The inter-symbol-distance measuring unit 36 derives an argument of the averaged vector. In FIG. 7, when the delay amount "Δt" is adjusted such that the argument becomes "π/2", the distance between symbols is the longest.

Next, an example of an operation of the optical communication system 1 will be described.

Figure 8:
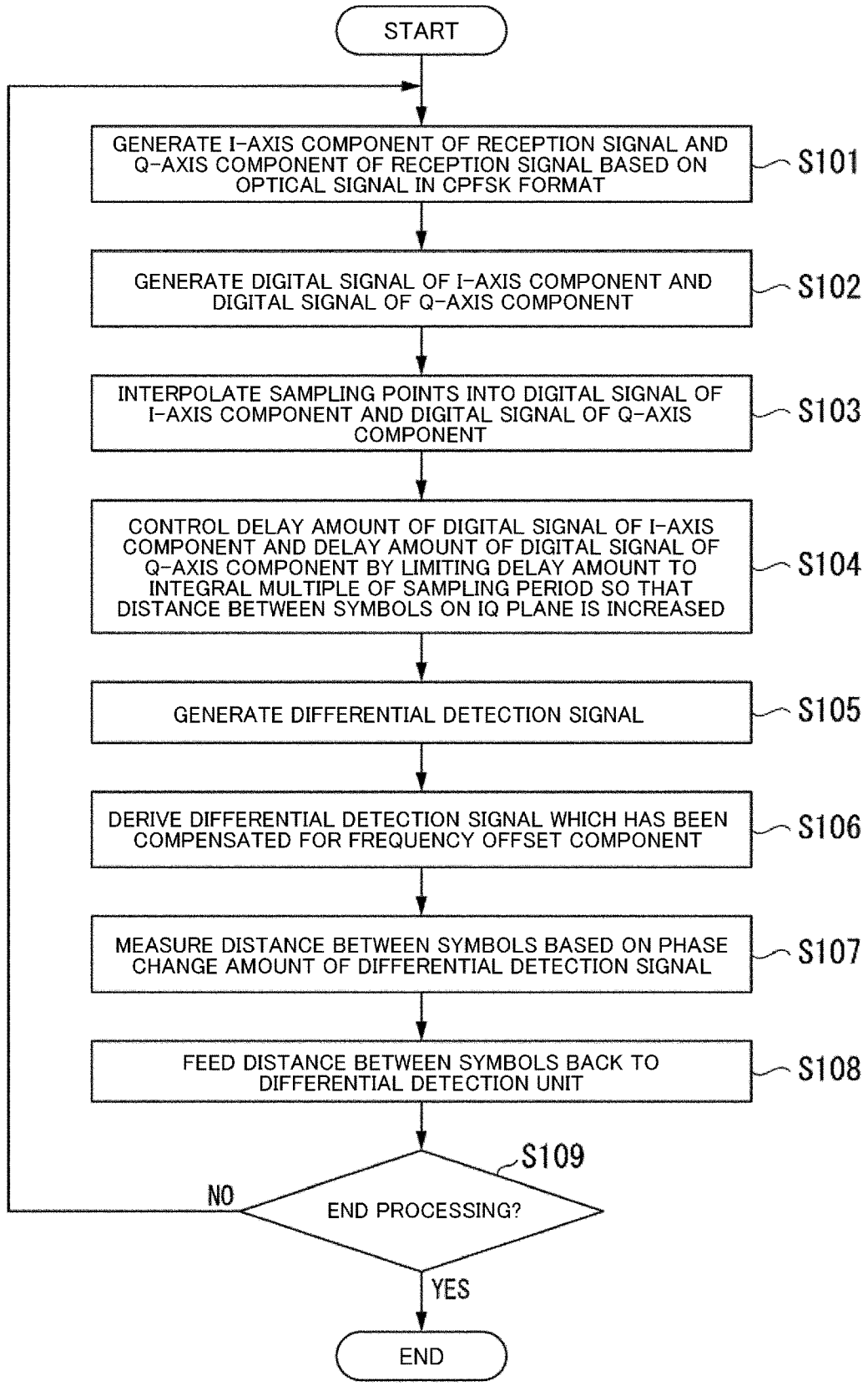
FIG. 8 is a flowchart illustrating an example of an operation of the optical communication system according to the first embodiment.

FIG. 8 is a flowchart illustrating an example of an operation of the optical communication system 1 according to the first embodiment. The optical coherent reception unit 30 performs coherent detection on a received coherent optical signal to generate an I-axis component of a reception signal (analog signal) and a Q-axis component of the reception signal based on the coherent optical signal (step S101). The ADC 31 samples the I-axis component of the reception signal and the Q-axis component of the reception signal to generate a digital signal of the I-axis component of the reception signal and a digital signal of the Q-axis component of the reception signal (step S102). The interpolation unit 32 interpolates sampling points into the digital signal of the I-axis component and the digital signal of the Q-axis component (step S103).

The differential detection unit 33 controls a delay amount "Δt" of each of the digital signal of the I-axis component and the digital signal of the Q-axis component by limiting the delay amount "Δt" to an integral multiple of the sampling period so that the distance between symbols on the IQ plane is increased (step S104). The differential detection unit 33 generates a differential detection signal by performing differential detection on the digital signal of the I-axis component whose delay amount is controlled and on the digital signal of the Q-axis component whose delay amount is controlled (step S105).

The frequency offset compensation unit 35 derives the differential detection signal which has been compensated for a frequency offset component (step S106). The inter-symbol-distance measuring unit 36 derives a phase change amount of the differential detection signal. The inter-symbol-distance measuring unit 36 measures a distance between symbols based on the phase change amount of the differential detection signal (step S107). The inter-symbol-distance measuring unit 36 feeds the distance between symbols back to the differential detection unit 33 (step S108).

The inter-symbol-distance measuring unit 36 determines whether to end the processing illustrated in FIG. 8 based on, for example, an instruction signal input to the optical reception apparatus 3 from an external apparatus (not illustrated) (step S109). If it is determined to continue the processing (NO in step S109), the inter-symbol-distance measuring unit 36 returns the processing to step S101. If it is determined to end the processing (YES in step S109), the inter-symbol-distance measuring unit 36 ends the processing illustrated in FIG. 8.

As described above, the optical coherent reception unit 30 (optical coherent receptor) receives a frequency-modulated coherent optical signal (for example, an optical signal in the CPFSK format) whose optical intensity is approximately constant. The optical coherent reception unit 30 performs coherent detection on the received coherent optical signal to generate an I-axis component of a reception signal (analog signal) and a Q-axis component of the reception signal based on the coherent optical signal. The ADC 31 (conversion unit) (converter) samples the I-axis component of the reception signal and the Q-axis component of the reception signal to generate a digital signal of the I-axis component of the reception signal and a digital signal of the Q-axis component of the reception signal. The differential detection unit 33 (differential detector) controls a delay amount "Δt" of each of the digital signal of the I-axis component and the digital signal of the Q-axis component so that the distance between symbols on the IQ plane is increased. The differential detection unit 33 generates a differential detection signal by performing differential detection on the digital signal of the I-axis component whose delay amount is controlled and on the digital signal of the Q-axis component whose delay amount is controlled. The inter-symbol-distance measuring unit 36 (inter-symbol-distance measurer) measures a distance between symbols based on a phase change amount of the differential detection signal. The inter-symbol-distance measuring unit 36 feeds the distance between symbols back to the differential detection unit 33.

As described above, the differential detection unit 33 controls the delay amount "Δt" of each of the digital signal of the I-axis component and the digital signal of the Q-axis component so that the distance between symbols on the IQ plane is increased.

Even when the control accuracy of at least one of the frequencies "$\omega_{MAX}$" and "$\omega_{MIN}$" is low in the optical transmission apparatus 2, reception sensitivity can be improved. Even when a deviation occurs in at least one of the frequencies "$\omega_{MAX}$" and "$\omega_{MIN}$" due to the deterioration over time, reception sensitivity can be improved. Further, the cost of the optical transmission apparatus 2 can be reduced.

Second Embodiment

A second embodiment differs from the first embodiment in that a delay insertion unit 330 controls a delay amount of a reception signal by using a linear phase filter. In the second embodiment, differences from the first embodiment will be mainly described.

In the first embodiment, a delay amount "Δt" is an integer multiple of the period of sampling performed by the interpolation unit 32. Therefore, to allow the delay insertion unit 330 to control the delay amount more precisely, the interpolation unit 32 needs to oversample the reception signal at a higher sampling rate. However, in such a case, the oversampling causes an increase in the computation amount.

Thus, in the second embodiment, regardless of the number of interpolated sampling points, a delay amount "Δt" is predetermined by a delay insertion unit 330. That is, the delay amount can be set to any amount and is not limited to an integer multiple of the sampling period. To control the delay amount "Δt" of a reception signal with higher accuracy in the differential detection processing, the delay insertion unit 330 controls the delay amount "Δt" of the reception signal by using a linear phase filter so that the distance between symbols becomes the longest. In the second embodiment, an optical reception apparatus 3 may not include an interpolation unit 32.

A finite impulse response (FIR) filter is known as a digital filter having a finite impulse response. The FIR filter outputs a convolution sum of a time waveform of an input signal and tap coefficients. The tap coefficients have a shape of the finite impulse response of the filter. Here, the FIR filter in which the phase characteristics of an input signal and the phase response of an output are linear is called a linear phase filter.

In particular, when the tap coefficients are designed such that an amplitude response is constant within the band of the reception signal input to the linear phase filter, no difference in shape is generated between an envelope of the waveform of the input signal and an envelope of the waveform of the output signal (impulse response). Therefore, when the linear phase filter is used, only the delay amount "Δt" can be changed without changing the shape of the reception signal (Reference 1: M. Fujiwara et al., "Performance Evaluation of CPFSK Transmitters for TDM-Based Digital Coherent PON Upstream", OFC2017).

Next, the linear phase filter will be described.

Figure 9:
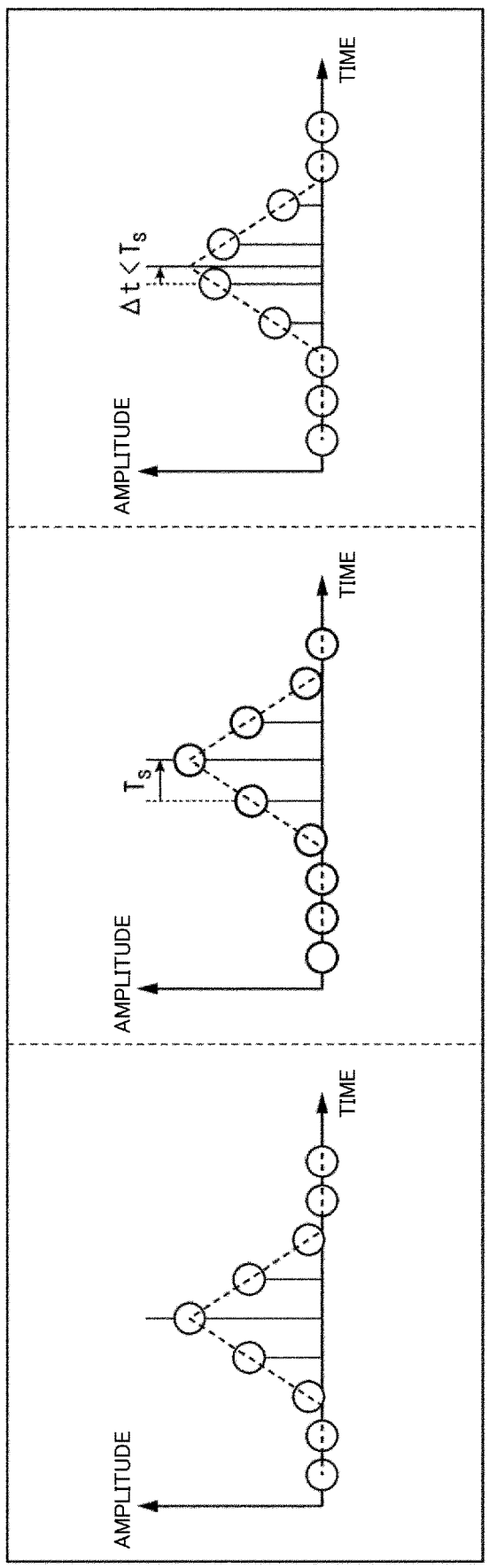
FIG. 9 illustrates examples of a phase response of a linear phase filter having tap coefficients according to a second embodiment.

FIG. 9 illustrates examples of tap coefficients of an FIR filter according to the second embodiment. The first diagram from the left in FIG. 9 illustrates an example of tap coefficients of a common linear phase filter. When tap coefficients having a bilaterally symmetrical shape as illustrated in FIG. 9 are used, the phase response of the FIR filter becomes linear. In the first FIR filter from the left in FIG. 9, a finite impulse response is represented by the envelope (dashed line illustrated in FIG. 9) of the tap coefficients.

The second diagram from the left in FIG. 9 illustrates an example of tap coefficients when the sampling phase is shifted by one tap. In this case, compared with the tap coefficients illustrated in the first diagram from the left in FIG. 9, a delay amount of a sampling period "Ts" occurs. The time resolution of the delay amount is the sampling period "Ts". Here, the tap coefficients have a bilaterally symmetrical shape, and the linearity of the phase response is maintained.

The third diagram from the left in FIG. 9 illustrates an example of a case where the sampling position of the tap coefficients is shifted by "Δt (where Ts>Δt)" in the time axis direction while maintaining the shape of the envelope of the finite impulse response. In this case, it has been reported that, while the tap coefficients have a bilaterally asymmetrical shape, the linearity of the phase response is maintained (Reference 2: K. Asami et al., "Digitally-Assisted Compensation Technique for Timing Skew in ATE Systems", 2011 IEEE 17th International Mixed-Signals, Sensors and Systems Test Workshop).

As described above, by shifting the sampling position of the tap coefficients in the time axis direction while the linear phase filter having a constant amplitude response within the band of a reception signal maintains the envelope of the finite impulse response, any delay amount can be inserted without changing the shape of the reception signal.

Next, an example of an operation of an optical communication system 1 will be described.

Figure 10:
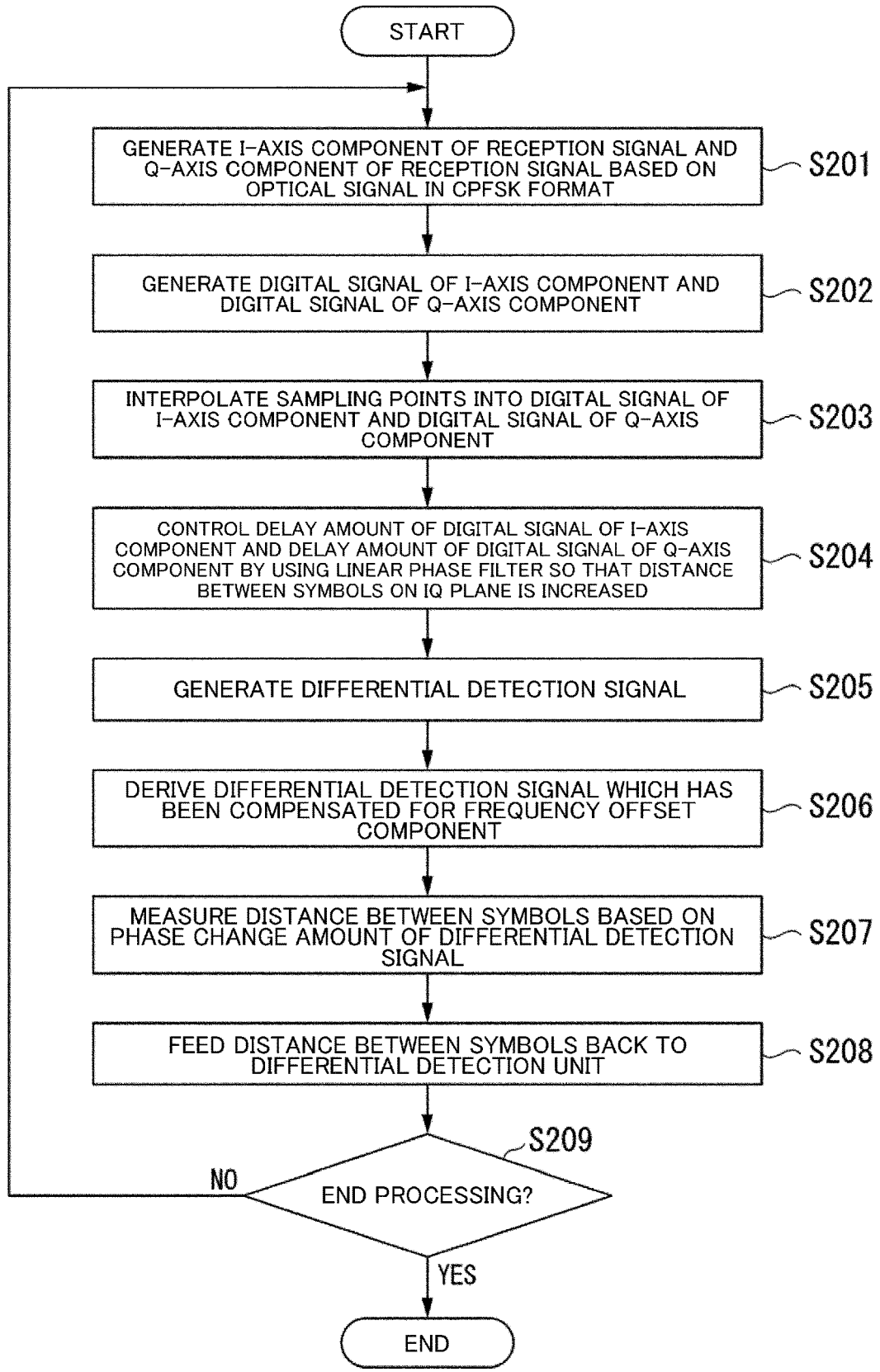
FIG. 10 is a flowchart illustrating an example of an operation of an optical communication system according to the second embodiment.
Figure 11:
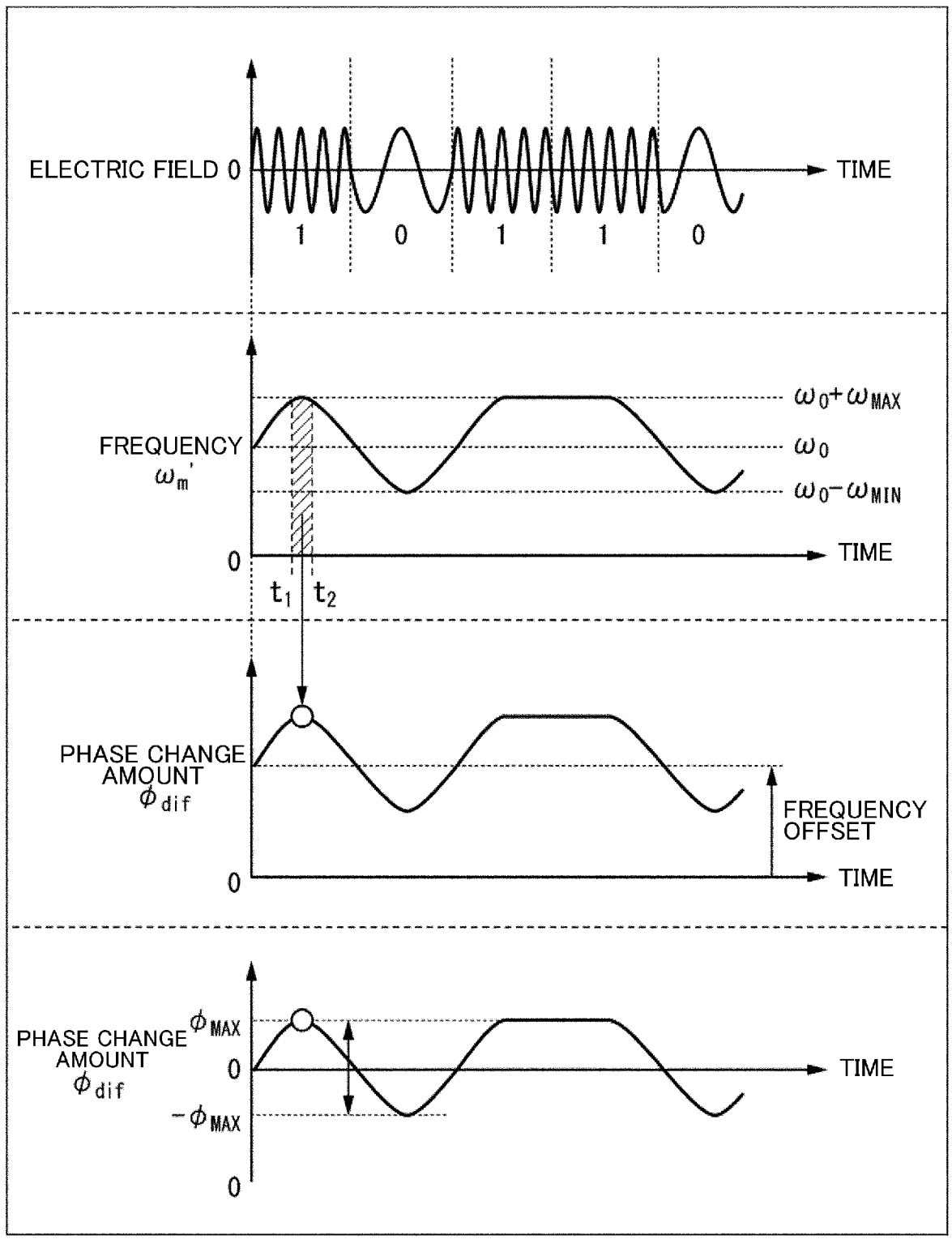
FIG. 11 illustrates an example of frequency modulation of an optical signal in a CPFSK format in the prior art.
Figure 12:
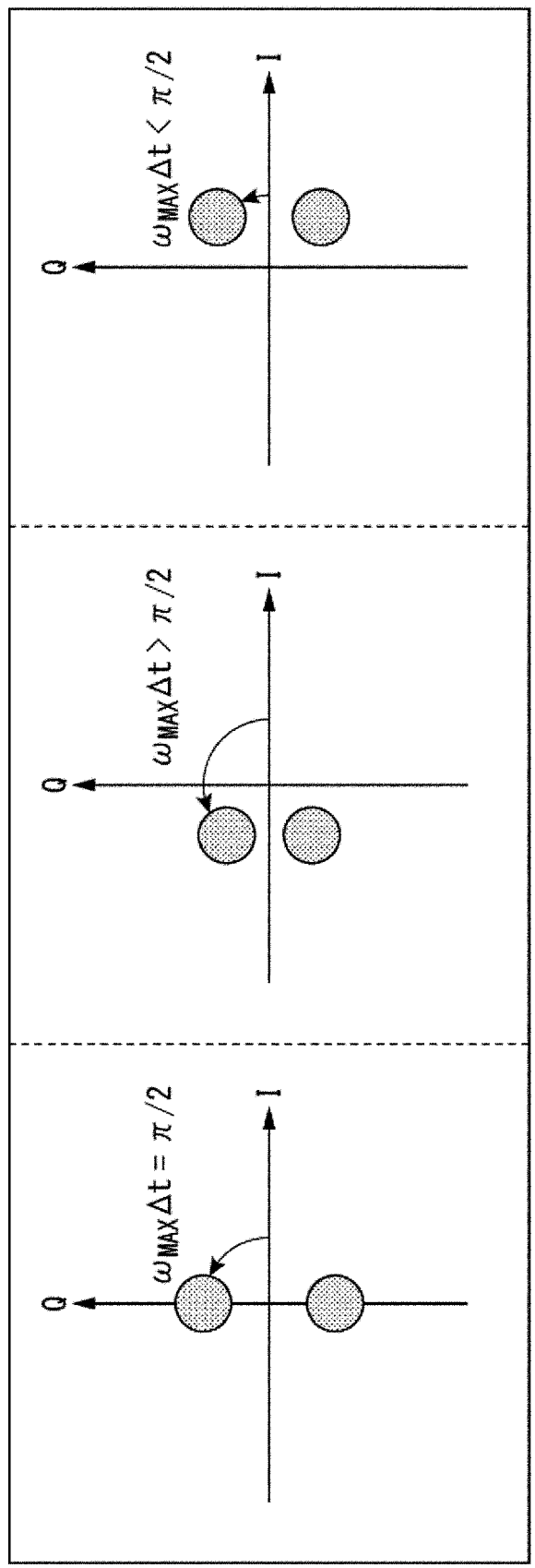
FIG. 12 illustrates examples of a constellation corresponding to symbols in the prior art.

FIG. 10 is a flowchart illustrating an operation example of the optical communication system 1 according to the second embodiment. Steps S201 to S203 are the same as steps S101 to S103 illustrated in FIG. 8.

A differential detection unit 33 controls a delay amount "Δt" of each of the digital signal of the I-axis component and the digital signal of the Q-axis component by using a linear phase filter so that a distance between symbols on the IQ plane is increased (step S204). Steps S205 to S208 are the same as steps S205 to S208 illustrated in FIG. 10.

To realize the insertion of the delay amount "Δt", in the first embodiment, the use of the interpolation processing in step S203 is proposed. However, in the second embodiment, since the insertion of the delay amount "Δt" is realized by using the linear phase in step S204, step S203 may be omitted.

As described above, the differential detection unit 33 controls the delay amount "Δt" by using the linear phase filter. The linear phase filter has tap coefficients for shifting a sampling position in the time axis direction while maintaining the shape of an envelope of a finite impulse response so that an amplitude response becomes approximately constant within the band of a reception signal. This enables the linear phase filter to insert any delay amount "Δt" into the reception signal. As a result, reception sensitivity can be further improved without causing the optical transmission apparatus to control the frequency of an optical signal with high accuracy.

Some or all of the functional units of the optical communication system 1 are implemented as software by a processor such as a central processing unit (CPU) executing a program stored in a storage unit including a nonvolatile recording medium (non-transitory recording medium). The program may be recorded in a computer-readable recording medium. Examples of the computer-readable recording medium include a portable medium such as a flexible disk, a magneto-optical disk, a read only memory (ROM), and a compact disc read only memory (CD-ROM), or a non-transitory recording medium, for example, a storage device such as a hard disk built in a computer system.

Some or all of the functional units of the optical communication system 1 may be implemented by using hardware including an electronic circuit or circuitry using, for example, a large scale integration (LSI) circuit, an application specific integrated circuit (ASIC), a programmable logic device (PLD), or a field programmable gate array (FPGA).

The embodiments of the present invention have thus been described with reference to the drawings. However, specific configurations are not limited to these embodiments, and designs and the like within the scope not departing from the gist of the present invention are included.

INDUSTRIAL APPLICABILITY

The present invention is applicable to an optical communication system.

REFERENCE SIGNS LIST

1 Optical communication system
2 Optical transmission apparatus
3 Optical reception apparatus
4 Transmission line
20 Frame generation unit
21 Signal generation unit
22 Optical coherent transmission unit
30 Optical coherent reception unit
31 ADC
32 Interpolation unit
33 Differential detection unit
34 Equalizer
35 Frequency offset compensation unit
36 Inter-symbol-distance measuring unit 37 Decoding unit
330 Delay insertion unit
331 Complex amplitude derivation unit
332 Complex conjugate processing unit
333 Complex amplitude derivation unit
334 Multiplication unit

The invention claimed is:

1. An optical reception apparatus, comprising:
an optical coherent receptor that receives a frequency-modulated optical signal whose optical intensity is approximately constant and performs coherent detection on the received optical signal to generate an I-axis component of a reception signal and a Q-axis component of the reception signal based on the optical signal;
a converter that generates a digital signal of the I-axis component of the reception signal and a digital signal of the Q-axis component of the reception signal by sampling the I-axis component of the reception signal and the Q-axis component of the reception signal;
a differential detector that generates a differential detection signal by controlling a delay amount of the digital signal of the I-axis component and a delay amount of the digital signal of the Q-axis component so that a distance between symbols on an IQ plane is increased and by performing differential detection on the digital signal of the I-axis component whose delay amount is controlled and on the digital signal of the Q-axis component whose delay amount is controlled; and
an inter-symbol-distance measurer that measures a distance between the symbols based on a phase change amount of the differential detection signal and feeds the distance between the symbols back to the differential detector.

2. The optical reception apparatus according to claim 1, further comprising:
a frequency offset compensator that derives the differential detection signal which is compensated for a frequency offset component,
wherein the inter-symbol-distance measurer measures a distance between the symbols based on a phase change amount of the differential detection signal which is compensated for the frequency offset component.

3. The optical reception apparatus according to claim 1, further comprising: an interpolator that interpolates sampling points into the digital signal of the I-axis component and the digital signal of the Q-axis component.

4. The optical reception apparatus according to claim 1, wherein the differential detector controls the delay amount by using a linear phase filter, and wherein the linear phase filter has tap coefficients for shifting a sampling position in a time axis direction so that an amplitude response becomes approximately constant while maintaining a shape of an envelope of a finite impulse response.

5. The optical reception apparatus according to claim 1, wherein the frequency modulation is continuous phase frequency shift keying.

6. An optical reception method performed by an optical reception apparatus, the optical reception method comprising:
an optical coherent reception process of receiving a frequency-modulated optical signal whose optical intensity is approximately constant and performing coherent detection on the received optical signal to generate an I-axis component of a reception signal and a Q-axis component of the reception signal based on the optical signal;
a conversion process of generating a digital signal of the I-axis component of the reception signal and a digital signal of the Q-axis component of the reception signal by sampling the I-axis component of the reception signal and the Q-axis component of the reception signal;
a differential detection process of generating a differential detection signal by controlling a delay amount of the digital signal of the I-axis component and a delay amount of the digital signal of the Q-axis component so that a distance between symbols on an IQ plane is increased and by performing differential detection on the digital signal of the I-axis component whose delay amount is controlled and on the digital signal of the Q-axis component whose delay amount is controlled; and
an inter-symbol-distance measuring process of measuring a distance between the symbols based on a phase change amount of the differential detection signal and feeding the distance between the symbols back to the differential detection process.

* * * * *